US011029286B2

(12) United States Patent
Kang et al.

(10) Patent No.: US 11,029,286 B2
(45) Date of Patent: Jun. 8, 2021

(54) ULTRASONIC CUTTER QUALITY INSPECTION METHOD AND DEVICE

(71) Applicant: DALIAN UNIVERSITY OF TECHNOLOGY, Liaoning (CN)

(72) Inventors: Renke Kang, Liaoning (CN); Zhigang Dong, Liaoning (CN); Xianglong Zhu, Liaoning (CN); Yidan Wang, Liaoning (CN); Xun Zhang, Liaoning (CN); Ping Zhou, Liaoning (CN); Zhenyuan Jia, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 245 days.

(21) Appl. No.: 16/467,376

(22) PCT Filed: Jul. 3, 2017

(86) PCT No.: PCT/CN2017/091440
§ 371 (c)(1),
(2) Date: Jun. 6, 2019

(87) PCT Pub. No.: WO2018/103323
PCT Pub. Date: Jun. 14, 2018

(65) Prior Publication Data
US 2019/0331645 A1 Oct. 31, 2019

(30) Foreign Application Priority Data

Dec. 6, 2016 (CN) .......................... 201611110894.5
Dec. 6, 2016 (CN) .......................... 201611111446.7

(51) Int. Cl.
*G01N 29/12* (2006.01)
*G01N 27/00* (2006.01)
(Continued)

(52) U.S. Cl.
CPC ............... *G01N 29/12* (2013.01); *G01H 9/00* (2013.01); *G01N 27/00* (2013.01); *G01N 29/227* (2013.01);
(Continued)

(58) Field of Classification Search
CPC ............... G01H 9/00; G01N 2291/014; G01N 2291/015; G01N 2291/023;
(Continued)

(56) References Cited

U.S. PATENT DOCUMENTS 4,965,532 A * 10/1990 Sakurai ..................... H03L 7/02
331/4
6,569,109 B2 * 5/2003 Sakurai ................. B06B 1/0253
601/2
(Continued)

FOREIGN PATENT DOCUMENTS

CN 1039549 A 2/1990
CN 1563892 A 1/2005
(Continued)

OTHER PUBLICATIONS

Dosik et al, The Development of Crack Measurement System Using the Direct Current Potential Drop Method for Use in the Hot Cell, Korea Atomic Energy Research Institute, AERI-Conf 99-009 (Year: 1999).*

(Continued)

*Primary Examiner* — David L Singer
(74) *Attorney, Agent, or Firm* — Novick, Kim & Lee, PLLC; Allen Xue

(57) ABSTRACT

An ultrasonic cutter detection method and device, the method comprises the following steps: preliminary detection: frequency amplitude detection and fall-of-potential detection, if the ultrasonic cutter fails the above two detection solutions in the preliminary detection, repeating the two (Continued)

detections; if the ultrasonic cutter still fails the above two detections, the ultrasonic cutter is judged to be unqualified; and reinspection: free modal detection and pressure modal detection. Using differences of the ultrasonic cutters surface in micro-crack directions that result in different degrees of sensitivity of crack to different ultrasonic vibration modes, combined with the fall-of-potential method and frequency amplitude detection method, a detection rate and a detection velocity of an unqualified ultrasonic cutter can be improved.

5 Claims, 7 Drawing Sheets

(51) Int. Cl.
G01N 29/22 (2006.01)
G01H 9/00 (2006.01)
(52) U.S. Cl.
CPC . G01N 2291/014 (2013.01); G01N 2291/023 (2013.01); G01N 2291/0258 (2013.01); G01N 2291/0289 (2013.01)
(58) Field of Classification Search
CPC ... G01N 2291/0258; G01N 2291/0289; G01N 27/00; G01N 29/043; G01N 29/11; G01N 29/12; G01N 29/227; G01N 29/2418; B26D 7/086; Y10S 83/956; B29C 65/7443
USPC .......................................................... 83/956
See application file for complete search history.

(56) References Cited

U.S. PATENT DOCUMENTS

| 6,662,127 | B2* | 12/2003 | Wiener | A61B 17/320068 |
| | | | | 702/75 |
| 2002/0049551 | A1* | 4/2002 | Friedman | A61B 17/320068 |
| | | | | 702/65 |
| 2005/0210983 | A1* | 9/2005 | Klein | G01N 29/222 |
| | | | | 73/627 |
| 2006/0181285 | A1* | 8/2006 | Friedman | A61B 17/320068 |
| | | | | 324/600 |
| 2008/0015620 | A1* | 1/2008 | Friedman | A61B 17/320068 |
| | | | | 606/169 |
| 2008/0245151 | A1 | 10/2008 | Roney et al. | |
| 2018/0200854 | A1* | 7/2018 | Ketelaer | B26D 7/086 |

FOREIGN PATENT DOCUMENTS

| CN | 102565133 | A | 7/2012 |
| CN | 102699763 | A | 10/2012 |
| CN | 203849207 | U | 9/2014 |
| CN | 105319402 | A | 2/2016 |
| CN | 205280637 | U | 6/2016 |
| CN | 205537939 | U | 8/2016 |
| CN | 106644033 | A | 5/2017 |
| CN | 106770674 | A | 5/2017 |
| EP | 2006676 | A1 | 12/2008 |
| JP | H109945 | A | 1/1998 |

OTHER PUBLICATIONS

MacBeath, Thesis Ultrasonic Bone Cutting, University of Glasgow (Year: 2006).*
Sherrit, S et al., "Novel Horn Design for Ultrasonic/Sonic Cleaning Welding, Soldering, Cutting and Drilling", Proceedings of the SPIE, vol. 4701, 31 Mar. 31, 2002, pp. 353-360, XP055510679.
Wu, Xin et al.: "Effect of Shape Parameters of Straight Blade Cutter on Performance of Ultrasonic Assisted Cutting System", Aeronautical Manufacturing Technology, Dec. 31, 2006, pp. 52-57, ISSN: 1671-833X.
Zhou, Shengli et al.: "Dynamics Analysis and Structural Optimization Design of an Ultrasonic Cutter", China Mechanical Engineering, vol. 24, No. 12, Jun. 30, 2013, pp. 1631-1635, ISSN: 1004-132X.
Ningchang Wang et al., "Study on High-Frequency Fatigue Properties of PVD TiCrAlN Coating of Cutting Tool", Journal of Mechanical Strength, 2015, vol. 37, No. 4, pp. 628-633.

* cited by examiner

ULTRASONIC CUTTER QUALITY INSPECTION METHOD AND DEVICE

TECHNICAL FIELD

The present disclosure relates to the detection field, and more particularly, to a method for detecting an ultrasonic cutter and a corresponding detection device.

BACKGROUND ART

Ultrasonic-assisted cutting machining technology is increasingly widely used in national economic production and life. Different from traditional machining, in an ultrasonic-assisted machining, a cutter not only performs a cutting motion and bears a cutting force, but also performs different forms of vibrating such as high-frequency stretching/compression, torsion, oscillation and the like under the drive of an ultrasonic vibration system. High-frequency vibration puts forward higher requirements on the quality of the cutter, especially the surface integrity of the cutter. If there are micro cracks in the cutter, then under high-frequency forced vibration, the crack extension may lead to the fracture of the cutter, which is prone to cause the damage of processed parts and even a machine tool. Therefore, before actual cutting machining, it is necessary to test the performance of the cutter, and detect and scrap the cutter with defects.

Related patents at home and abroad can be divided into the following categories: 1. Through stress of an ultrasonic frequency change acted on a tested sample, a high-frequency alternating stress is applied to the sample in a short time, and the crack or surface morphology of the tested sample is observed to determine whether the sample meets the standard. For example, through a temperature detection method suitable for cutter fatigue damage, fatigue damage detection is performed on the material and structure of the tool by detecting the characteristics such as the linear coefficient of a stimulated resonant wave emitted by the ultrasonic machining tool when it is stimulated by ultrasonic. This detection method has low efficiency and is not suitable for large-scale detection. 2. Similar to a detection principle of acoustic emission, ultrasonic signals of a certain frequency and phase position are emitted to a tested piece, and reflected ultrasonic signals are collected to determine the crack or defect of the tested piece. This method is also not suitable for the detection of the ultrasonic cutter. If the cutter does not have defects such as crack at the beginning of use, but only a metallographic structure is not strong enough, the cutter may also be fractured with load at high frequency, and the ultrasonic cutter cannot be accurately detected by this method. 3. Fall-of-potential method to detect the fracture of the tested piece, this detection method is mostly used for the crack detection of a long-distance pipeline. For example, a low-temperature fatigue crack extension rate test device uses a direct current fall-of-potential method to detect a fatigue crack extension state of metal materials. If only the fall-of-potential method is used in the crack detection of the ultrasonic cutter, there may be large errors. Since the crack of the cutter is not stressed without vibration and in a closed state, a resistance is not much different from that in a normal state. However, ultrasonic cutter may cause the opening and closing of the crack under stress and vibration. Therefore, the present disclosure has made improvements to test the electrical parameters thereof under stress and vibration, so as to improve the detection accuracy.

The present disclosure adopts a self-designed ultrasonic cutter detection method, integrates the methods of frequency amplitude detection, fall-of-potential detection, free mode detection and pressure mode detection, through a complete detection process, improves the detection accuracy rate of the quality of the ultrasonic cutter, reduces the probability of crack failure of ultrasonic cutter in the processing process, and improves the production efficiency and machining safety.

SUMMARY OF THE INVENTION

According to the technical problems mentioned above, a method for detecting an ultrasonic cutter is provided.

The technical means used in the present disclosure are as follows.

An ultrasonic cutter detection method comprises the following steps:

preliminary detection:

frequency amplitude detection: making an ultrasonic cutter in a resonant state, and collecting resonant frequency and amplitude of the ultrasonic cutter at a certain position; collecting the resonant frequencies and the amplitudes of the ultrasonic cutter at other positions in the same way; and if the resonant frequencies and the amplitudes collected (referring to the resonant frequencies and the amplitudes collected on a certain position and other positions of the ultrasonic cutter in the frequency amplitude detection) all fluctuate within a normal range, determining that the ultrasonic cutter passes the preliminary detection, wherein the normal range indicates that the resonant frequency fluctuates within ±10% of corresponding set value of an ultrasonic power supply system, and the amplitude fluctuates within ±5% of the set value of a laser displacement sensor;

fall-of-potential detection: contacting a detection head with the ultrasonic cutter, then making the ultrasonic cutter in a resonant state, and detecting a voltage and a current between a contacted point on the ultrasonic cutter where contacted to the detection head and an another point on the ultrasonic cutter other than the contacted point by the fall-of-potential detection; changing a position of the contacted point on the ultrasonic cutter where contacted to the detection head, and detecting voltage and current between the new contacted point and a point on the ultrasonic cutter that other than the new contacted point in the same way; and if the voltages and the currents detected (i.e. the voltages and the currents between the contacted point on the ultrasonic cutter where contacted to the detection head and an another point on the ultrasonic cutter other than the contacted point, and the voltages and the currents between the new contacted point and a point on the ultrasonic cutter other than the new contacted point) all fluctuate within the normal range, determining that the ultrasonic cutter passes the preliminary detection, wherein the normal range indicates that the voltage and the current both fluctuate within ±8% of the set value of the detected equipment;

if the ultrasonic cutter fails to pass the preliminary detection in the above two detection solutions, repeating the two detections again, and if the ultrasonic cutter still fails to pass the two detection solutions, determining that the ultrasonic cutter is substandard; wherein there is no logical ordinal relationship between the frequency amplitude detection and the fall-of-potential detection, and whichever detection to be performed firstly falls within the protection scope of the present disclosure; and reinspection:

free mode detection: the ultrasonic cutter passing the preliminary detection vibrating in a frequency range of 15 KHz to 40 KHz, searching every resonant mode of the ultrasonic cutter in the frequency range of 15 KHz to 40 KHz, in each resonant mode, in the case that the ultrasonic cutter is not fractured after vibrating under an amplitude exceeding a normal working amplitude by 20%, determining that the ultrasonic cutter passes the free mode detection, and if the ultrasonic cutter is fractured, determining that the ultrasonic cutter is unqualified; and pressure mode detection: in the case that the detection head applies a pressure exceeding a normal working pressure by 20% to the ultrasonic cutter passing the free mode detection, the ultrasonic cutting vibrating in the frequency range of 15 KHz to 40 KHz, and searching every resonant mode of the ultrasonic cutter in the frequency range of 15 KHz to 40 KHz, if the ultrasonic cutter is not fractured after vibrating in each resonant mode, changing the contacted point where a pressure stress is applied by the detection head, to the ultrasonic cutter passing the free mode detection, and detecting in the same way; and if the ultrasonic cutter is not fractured, determining that the ultrasonic cutter passes the reinspection; wherein the detecting in the same way mentioned in the pressure mode detection indicates that the ultrasonic cutter vibrates in the frequency range of 15 KHz to 40 KHz, and searches every resonant mode of the ultrasonic cutter in the frequency range of 15 KHz to 40 KHz, and the ultrasonic cutter vibrates in each resonant mode;

during the pressure mode detection, the detection head being always contacted with the ultrasonic cutter passing the free mode detection.

The vibrating of the ultrasonic cutter is realized through an ultrasonic amplitude transformer connected therewith, and the ultrasonic amplitude transformer is driven by an ultrasonic power supply to change the frequency and the amplitude of the ultrasonic cutter. The vibrating of the ultrasonic cutter comprises resonance.

The ultrasonic power supply automatically searches the resonant frequencies and repeatedly adjusts the output power and output frequency of the ultrasonic power supply to make the ultrasonic cutter reaches resonance.

The magnitude and direction of the pressure stress in the pressure mode detection are time functions or constants.

The resonant frequency and the amplitude in the frequency amplitude detection are collected by laser displacement sensor.

The present disclosure further provides a device for detecting an ultrasonic cutter matched with the detection method above, which comprises a laser displacement sensor, an ultrasonic cutter detection head, a rotating sleeve and a base, wherein the rotating sleeve is connected with the base through a rotating shaft, the rotating sleeve is provided with an ultrasonic amplitude transformer coaxial with the rotating shaft, a flange part on the ultrasonic amplitude transformer is clamped by the rotating sleeve, an end of the ultrasonic amplitude transformer far away from the rotating sleeve is provided with an ultrasonic cutter clamping part, and a position of the ultrasonic cutter detection head relatives to the ultrasonic cutter clamping part is adjusted through a position adjusting device. The adjusting device can drive the ultrasonic cutter detection head to move in a transverse direction or a longitudinal direction, the adjusting device is also provided with a nut for adjusting a height of the ultrasonic cutter detection head, when the adjusting device is located an appropriate position, the ultrasonic cutter detection head may just lean against the appropriate position of the ultrasonic cutter with an appropriate pressure, and the ultrasonic cutter detection head can be fixed by a screw. When the resonant frequency and the amplitude of the ultrasonic cutter are to be measured by the laser displacement sensor, a detection laser from the laser displacement sensor is just applied at the blade of the ultrasonic cutter while the ultrasonic cutter detection head is moved away, an ultrasonic power supply is turned on and the ultrasonic cutter is detected by an appropriate detection method; and when the mode detection of current, voltage and applied pressure is to be performed, the ultrasonic cutter detection head is moved to the part of the ultrasonic cutter for detection. The laser displacement sensor can measure the resonant frequency and the amplitude of the ultrasonic cutter along three directions of xyz, and the ultrasonic amplitude transformer can transfer energy generated by the ultrasonic power supply to the ultrasonic cutter and amplify the amplitude. The rotating sleeve can rotate around the rotating shaft to detect the ultrasonic cutter in a plurality of azimuth.

The ultrasonic cutter has a straight-blade knife, a length of the straight-blade knife is L, a maximum width of the straight-blade knife is W, a maximum thickness of the straight-blade knife is T, and a wedge angle of the blade of the straight-blade knife in the plane perpendicular to a cutter shaft is α;

The ultrasonic cutter detection head is provided with a wedge-shaped groove, a bottom of the wedge-shaped groove is provided with a blade accommodating groove for preventing the blade of the straight-blade knife from damaging, a length of the wedge-shaped groove is L/2 and a depth of the wedge-shaped groove is W/6, a length of the blade accommodating groove is L/2 and a depth of the blade accommodating groove is W/12, and the wedge-shaped groove is communicated with the blade accommodating groove through a rectangular hole.

A length of the rectangular hole is L/2, a width of the rectangular hole is $$\frac{W}{16} \cdot \tan\frac{\alpha}{2},$$

and an angle between two groove walls of the wedge-shaped groove is also α, so as to ensure that the blade part of the straight-blade knife may be safely inserted into the blade accommodating groove.

The ultrasonic cutter detection head is made of nylon and is provided with a threading hole, a part of the wedge-shaped groove contacted with the ultrasonic cutter is bonded or coated with graphite layer, the graphite layer is connected with a wire, and the other end of the wire passes through the threading hole and is connected with a fall-of-potential detection device.

Another ultrasonic cutter detection head is U-shaped, the opening of the ultrasonic cutter detection head is provided with four force adjustment knobs, every two force adjustment knobs form a group and are oppositely arranged to the other two force adjustment knobs, the force adjustment knob comprises a bolt, a spring and a contact rod contacted with the ultrasonic cutter which are sequentially connected, the ultrasonic cutter detection head is provided with a hole through which the contact rod passes, and the bolt is connected with the ultrasonic cutter detection head through a bolt seat.

Another ultrasonic cutter detection head is U-shaped, the opening of the ultrasonic cutter detection head is provided with two force adjustment knobs, the two force adjustment knobs are oppositely arranged to each other, the force adjustment knob comprises a bolt, a spring and a contact rod contacted with the ultrasonic cutter which are sequentially connected, the ultrasonic cutter detection head is provided with a hole through which the contact rod passes, and the bolt is connected with the ultrasonic cutter detection head through a bolt seat.

A part of the contact rod contacted with the ultrasonic cutter is made of nylon and is electrically connected with a current and voltage detection device, the spring is a precision spring with an adjustment range of 0 to 50 N and a stiffness coefficient of 2 N/mm, and a screw pitch of the bolt is 1 mm. Each positive rotation of the bolt in a circle, the spring is compressed by 1 mm, the force acting on the ultrasonic cutter is increased by 2 N to 4 N for.

The present disclosure can realize the fall-of-potential detection method, the frequency amplitude detection method, the free mode detection method and the pressure mode detection method; the anti-fatigue capability of the ultrasonic cutter can be accurately judged by using the present disclosure; the cutter that does not have the anti-fatigue fracture capability is determined as unqualified cutter, and the cutter that has the anti-fatigue fracture capability is determined as qualified cutter and put into production; the present disclosure can avoid the adverse effects of low production efficiency and the like caused by the unqualified ultrasonic cutter fractured in the production process. In the present disclosure, using differences of the ultrasonic cutter surface in micro-cracks geometries and crack directions that result in different degrees of sensitivity of the track to different ultrasonic vibration modes, combined with the fall-of-potential method and the frequency amplitude detection method, can improve a detection rate of the unqualified ultrasonic cutter and a detection velocity.

Based on the advantages above, the present disclosure may be widely popularized in industries or fields such as research and development and production of the ultrasonic cutter, application of ultrasonic cutting machining technology, and research on ultrasonic cutting machining technology and the like.

BRIEF DESCRIPTION OF THE DRAWINGS

The present disclosure is further described in detail hereinafter with reference to the drawings and the detailed embodiments.

DETAILED DESCRIPTION OF THE PREFERRED EMBODIMENTS

Embodiment 1

Figure 1:
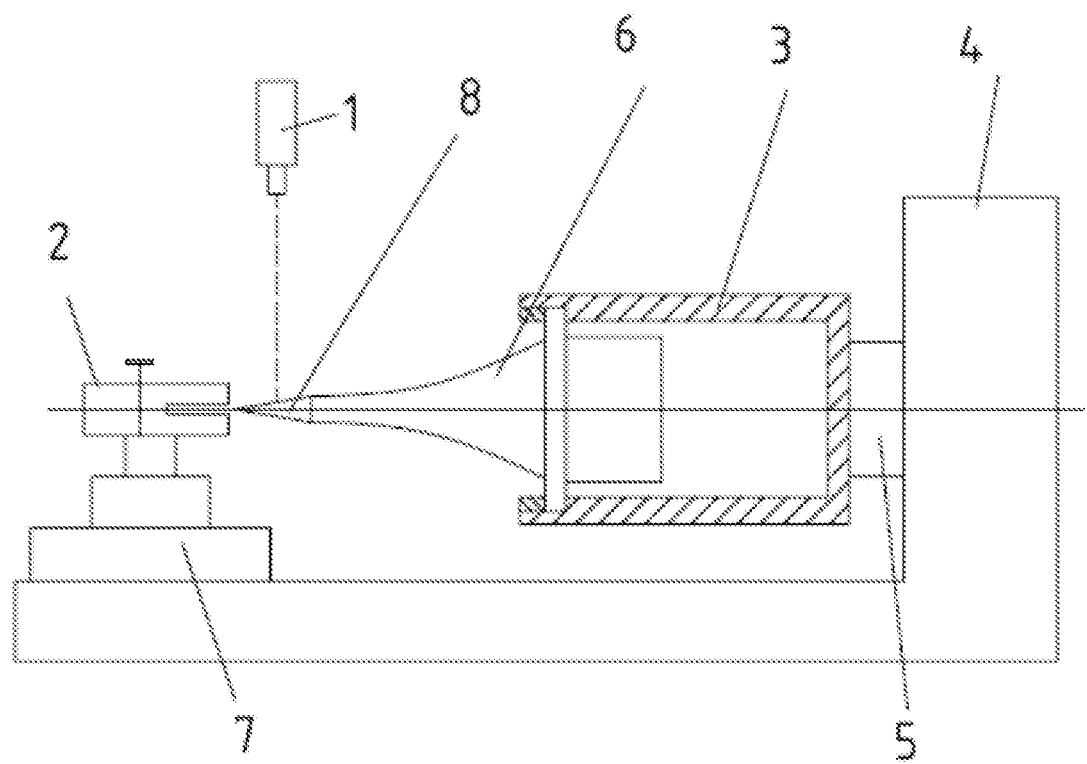
FIG. 1 is a structure diagram of an ultrasonic cutter detection device in the embodiment 1 of the present disclosure.
Figure 2:
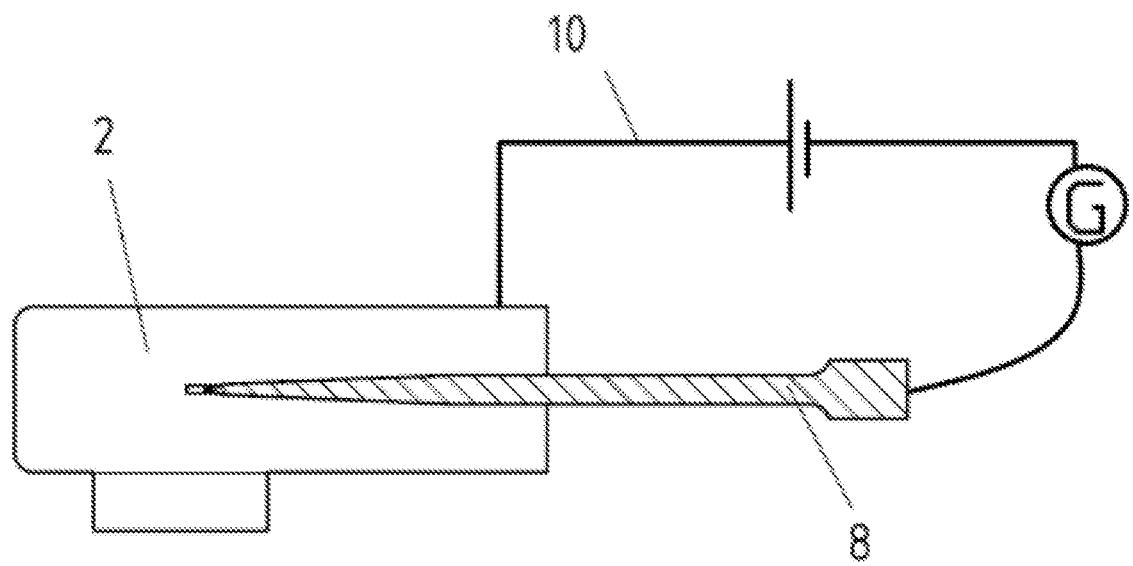
FIG. 2 is a diagram illustrating the connection between the ultrasonic cutter detection head and the ultrasonic cutter in the embodiment 1 of the present disclosure.
Figure 3:
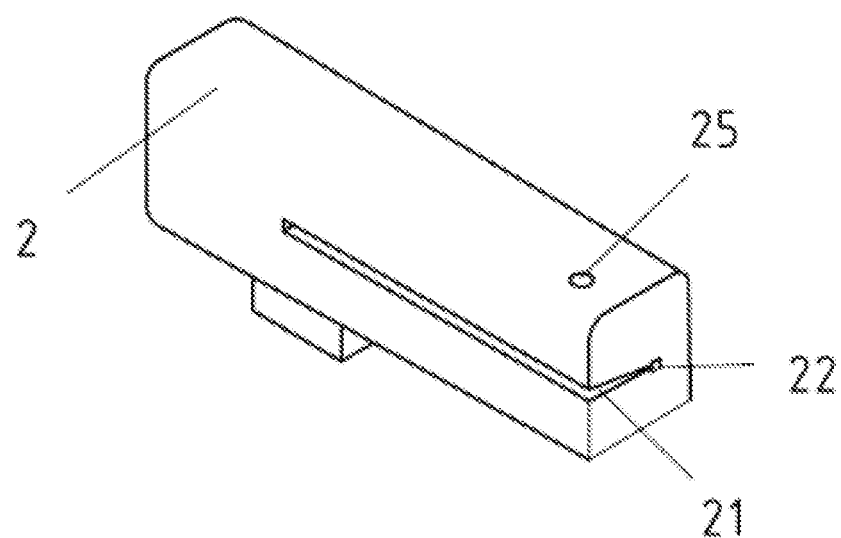
FIG. 3 is a structure diagram of the ultrasonic cutter detection head in the embodiment 1 of the present disclosure.
Figure 4:
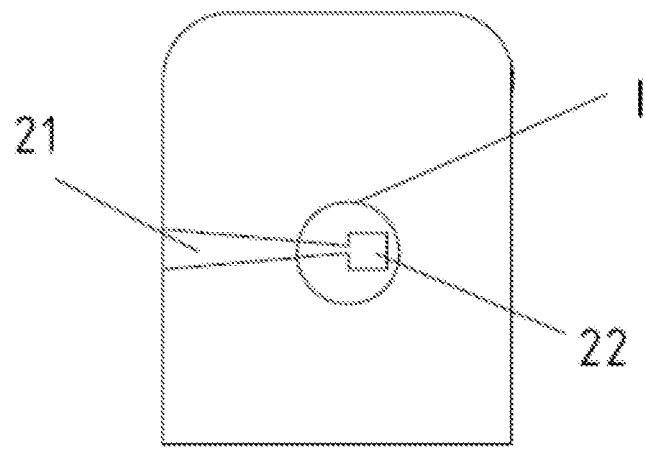
FIG. 4 is a side view of the ultrasonic cutter detection head in the embodiment 1 of the present disclosure.
Figure 5:
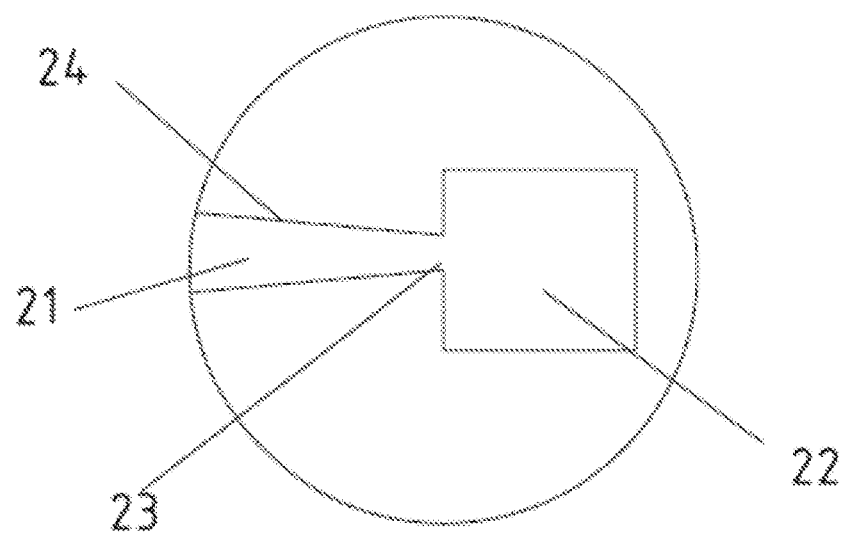
FIG. 5 is a partially enlarged diagram of part I in FIG. 4.
Figure 6:
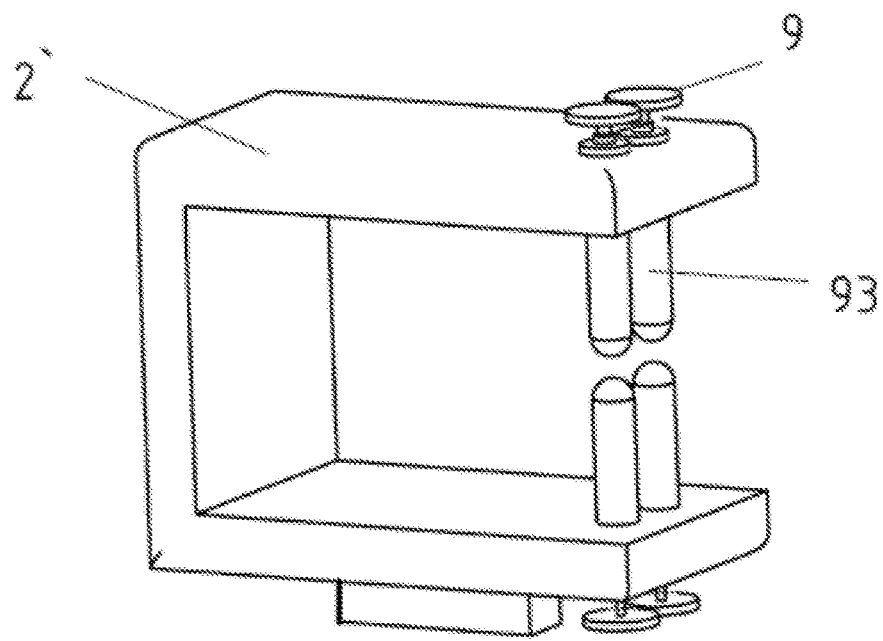
FIG. 6 is a structure diagram of the ultrasonic cutter detection head in the embodiment 2 of the present disclosure.
Figure 7:
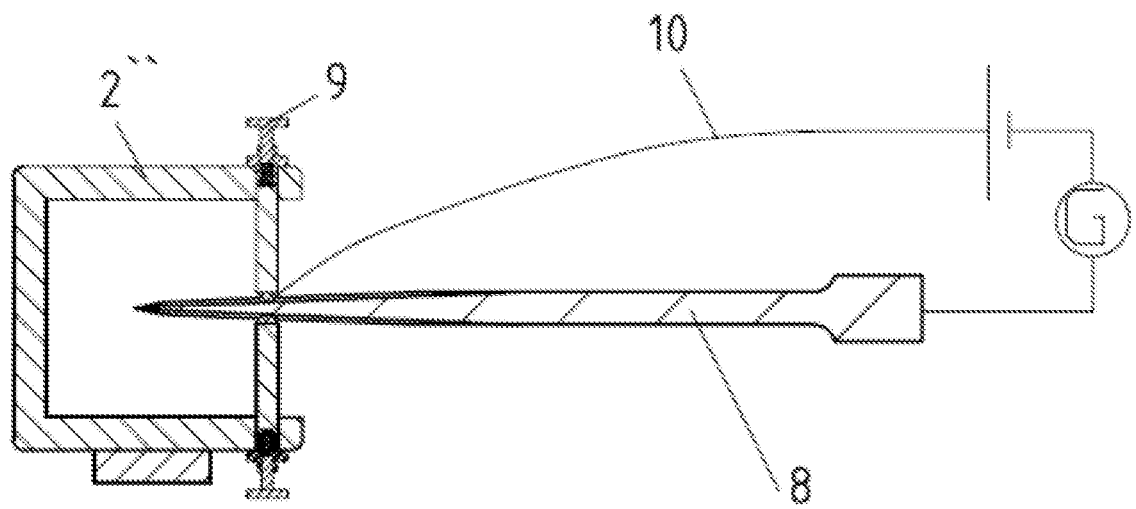
FIG. 7 is a diagram illustrating the connection between the ultrasonic cutter detection head and the ultrasonic cutter with a straight-blade knife in the embodiment 3 of the present disclosure.
Figure 8:
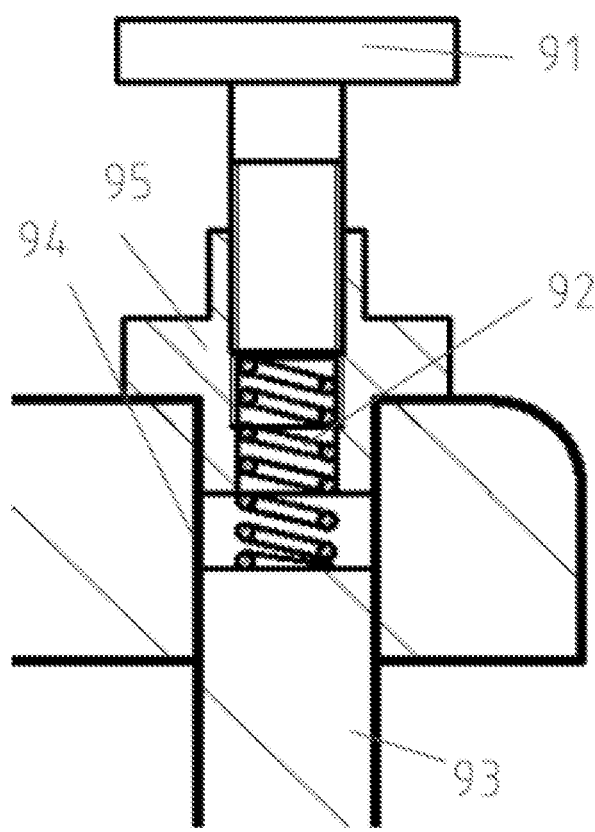
FIG. 8 is a structure diagram of a force adjustment knob in the embodiment 2 and the embodiment 3 of the present disclosure.

A method for detecting an ultrasonic cutter comprises the following steps:

preliminary detection:

frequency amplitude detection: installing an ultrasonic cutter 8 on an ultrasonic amplitude transformer 6 capable of rotating along an axial direction, turning on the ultrasonic power supply to enable the ultrasonic cutter 8 to be in a resonant state, collecting the resonant frequency and amplitude of the blade on one side of the ultrasonic cutter 8 by a laser displacement sensor 1, then rotating (180°) the ultrasonic amplitude transformer 6 and the ultrasonic cutter 8; collecting the resonant frequency and the amplitude of the blade of the other side of the ultrasonic cutter 8 in the same way; and if the resonant frequencies and the amplitudes collected twice all fluctuate within a normal range, determining that the ultrasonic cutter 8 passes the preliminary detection;

fall-of-potential detection: installing the ultrasonic cutter 8 on the ultrasonic amplitude transformer 6 capable of rotating along the axial direction, pressing the detection head 2 on the ultrasonic cutter 8, turning on the ultrasonic power supply to enable the ultrasonic cutter 8 to be in a resonant state, and detecting the voltage and current between a contacted point (located on the blade on one side of the ultrasonic cutter 8) on the ultrasonic cutter 8 where contacted to the detection head and an another point on the ultrasonic cutter 8 other than the contacted point by the fall-of-potential detection; rotating (180°) the ultrasonic amplitude transformer 6 and the ultrasonic cutter 8 to change the position of the contacted point on the ultrasonic cutter 8 where contacted to the detection head 2, and detecting the voltage and current between the new contacted point (located on the blade of the other side of the ultrasonic cutter 8) and a point on the ultrasonic cutter 8 other than the new contacted point in the same way; and if the voltages and the currents detected all fluctuate within the normal range, determining that the ultrasonic cutter 8 passes the preliminary detection;

if the ultrasonic cutter 8 fails to pass the preliminary detection in the two above detection solutions, repeating the two detections again, and if the ultrasonic cutter 8 still fails to pass the two detection solutions, determining that the ultrasonic cutter 8 is unqualified; and reinspection:

free mode detection: installing the ultrasonic cutter 8 passing the preliminary detection on the ultrasonic amplitude transformer 6, turning on the ultrasonic power supply and using automatic frequency sweep function of it to automatically sweep the frequency in a frequency range of 15 KHz to 40 KHz, so as to drive the ultrasonic cutter 8 to vibrate in the frequency range of 15 KHz to 40 KHz, and searching every resonant mode of the ultrasonic cutter 8 in the frequency range of 15 KHz to 40 KHz;

in each resonant mode, in the case that the ultrasonic cutter 8 is not fractured after vibrating under an amplitude exceeding a normal working amplitude by 20% in each resonant mode, determining that the ultrasonic cutter 8 passes the free mode detection, and if the ultrasonic cutter 8 is fractured, determining that the ultrasonic cutter 8 is unqualified; and pressure mode detection: in the case that the detection head 2 applies a pressure exceeding a normal working pressure by 20% to the blade of one side of the ultrasonic cutter 8 passing the free mode detection, turning on the ultrasonic power supply and using the automatic frequency sweep function of it to automatically sweeping the frequency in the frequency range of 15 KHz to 40 KHz, so as to drive the ultrasonic cutter 8 to vibrate in the frequency range of 15 KHz to 40 KHz, and searching every resonant mode of the ultrasonic cutter 8 in the frequency range of 15 KHz to 40 KHz, and meanwhile, changing the magnitude and direction of the pressure stress or keeping the original value unchanged, which is intended to simulate an actual working state of the ultrasonic cutter 8 during machining in a machining state, if the ultrasonic cutter 8 is not fractured after vibrating in each resonant mode, rotating (180°) the ultrasonic amplitude transformer 6 and the ultrasonic cutter 8, changing the contacted point where the pressure stress is applied by the detection head 2, to the ultrasonic cutter 8 passing the free mode detection, and detecting in the same way; and if the ultrasonic cutter 8 is not fractured, determining that the ultrasonic cutter 8 passes the reinspection;

during the pressure mode detection, the detection head 2 being always contacted with the ultrasonic cutter 8 passing the free mode detection.

The vibrating of the ultrasonic cutter 8 is realized through the ultrasonic amplitude transformer 6 connected therewith, and the ultrasonic amplitude transformer 6 is driven by the ultrasonic power supply to change the frequency and amplitude of the ultrasonic cutter 8.

The ultrasonic power supply automatically searches the resonant frequencies and repeatedly adjusts the output power and output frequency of the ultrasonic power supply to make the ultrasonic cutter 8 reaches resonance.

The magnitude and direction of the pressure stress in the pressure mode detection are time functions.

As shown in FIGS. 1 to 5, and FIGS. 10 to 12, a device for detecting an ultrasonic cutter that adopts the above method for detecting an ultrasonic cutter comprises a laser displacement sensor 1, an ultrasonic cutter detection head 2, a rotating sleeve 3 and a base 4, wherein the rotating sleeve 3 is connected with the base 4 through a rotating shaft 5, the rotating sleeve 3 is provided with an ultrasonic amplitude transformer 6 coaxial with the rotating shaft 5, a flange part on the ultrasonic amplitude transformer 6 is clamped by the rotating sleeve 3, an end of the ultrasonic amplitude transformer 6 far away from the rotating sleeve 3 is provided with an ultrasonic cutter clamping part, and a position of the ultrasonic cutter detection head 2 relatives to the ultrasonic cutter clamping part is adjusted through a position adjusting device 7.

The ultrasonic cutter 8 has a straight-blade knife, a length of the straight-blade sharp knife is L, a maximum width of the straight-blade sharp knife is W, a maximum thickness of the straight-blade sharp knife is T, and a wedge angle of the blade of the straight-blade knife in the plane perpendicular to a cutter shaft is α;

The ultrasonic cutter detection head 2 is provided with a wedge-shaped groove 21, a bottom of the wedge-shaped groove 21 is provided with a blade accommodating groove 22 for preventing the blade of the straight-blade knife from damaging, a length of the wedge-shaped groove 21 is L/2 and a depth of the wedge-shaped groove 21 is W/6, a length of the blade accommodating groove 22 is L/2 and a depth of the blade accommodating groove 22 is W/12, and the wedge-shaped groove 21 is communicated with the blade accommodating groove 22 through a rectangular hole 23, a length of the rectangular hole 23 is L/2, a width of the rectangular hole 23 is $$\frac{W}{16} \cdot \tan\frac{\alpha}{2},$$

and an included angle between two groove walls 24 of the wedge-shaped groove 21 is also α.

The ultrasonic cutter detection head 2 is made of nylon and is provided with a threading hole 25, a part of the wedge-shaped groove 21 contacted with the ultrasonic cutter 8 is bonded or coated with graphite layer, the graphite layer is connected with a wire, and the other end of the wire passes through the threading hole 25 and is connected with a fall-of-potential detection device.

The above-mentioned device for detecting an ultrasonic cutter, the detection head 2 can move along transverse and longitudinal directions of the base, and a height of the detection head 2 can be adjusted by adjusting a nut fixed at a bottom part of the detection head 2. When the detection head 2 is adjusted to an appropriate position, the detection head 2 can be fixed by a screw on it. When the laser displacement sensor 1 is used to collect the resonant frequency and the amplitude of the ultrasonic cutter 8, the detection head 2 is moved away, and when the fall-of-potential detection method is used for detection, the detection head 2 is moved to the ultrasonic cutter 8 for detection.

The detection head 2 of the ultrasonic detection device of this embodiment is a radial direction detection head, which is provided with a groove 21 for accommodating the ultrasonic cutter 8. The contacted part of the groove 21 contacted to the ultrasonic cutter 8 is made of a soft conductive material with low rigidity, such as graphite, copper, etc. A wire 10 is led out from the contacted point between the ultrasonic cutter 8 and the radial direction detection head (the radial direction detection head has a wire lead-out hole 25), using the fall-of-potential detection to detect. A tail end of the groove 21 is provided with a blade accommodating groove 22 to prevent the blade from damaging when the radial direction detection head colliding with a front-end blade of the ultrasonic cutter 8 during resonance and applying the pressure stress.

The radial detection head applies the pressure stress in such a way that the straight-blade sharp cutter 8 is clamped in the groove 21 of the detection head 2, and a fine adjustment knob on the detection head 2 is rotated, so that the detection head will be offset by a slight displacement relative to the ultrasonic cutter, thereby applying the pressure.

The laser displacement sensor 1 can detect the resonant frequency and the amplitude of the ultrasonic cutter 8 in three directions.

The ultrasonic amplitude transformer 6 is located in the rotating sleeve 3 and can rotate relative to the base 4 through the rotating sleeve 3 (the rotating sleeve 3 can rotate around a horizontal axis), thus driving the ultrasonic cutter 8 to rotate to the detection position. The ultrasonic amplitude transformer 6 transmits the energy generated by the ultrasonic power supply to the ultrasonic cutter 8 and amplifies the amplitude.

The ultrasonic cutter 8 is a type of straight-blade knife.

Embodiment 2

As shown in FIG. 6, FIG. 8, FIG. 10 and FIG. 11, an ultrasonic cutter detection device and method, it differs from the device and method disclosed in embodiment 1 in that the ultrasonic cutter detection head 2' is U-shaped, the opening of the ultrasonic cutter detection head 2' is provided with four force adjustment knobs 9, every two force adjustment knobs 9 form a group and are oppositely arranged to the other two force adjustment knobs, the force adjustment knob 9 comprises a bolt 91, a spring 92 and a contact rod 93 contacted with the ultrasonic cutter 8, which are sequentially connected, and the ultrasonic cutter detection head 2' is provided with a hole 94 through which the contact rod passes. The bolt 91 is connected with the ultrasonic cutter detection head 2' through a bolt seat 95.

In this embodiment, an axial detection head 2' is adopted, the axial detection head is in open-type contact with the blade of the ultrasonic cutter 8, a contacted part of the contact rod 93 contacted with the ultrasonic cutter 8 is made of nylon and is electrically connected with a current and voltage detection device, the spring 92 is a precision spring with an adjustment range of 0 to 50 N and a stiffness coefficient of 2 N/mm, and a screw pitch of the bolt 91 is 1 mm.

The axial detection head applies the pressure stress by rotating the bolt 91, so that the pressure stress applied to the ultrasonic cutter 8 by the contact rod 93 becomes larger and larger, and the other end of the contact rod 93 is always retained in the hole 94.

Embodiment 3

As shown in FIG. 7, FIG. 8, FIG. 10 and FIG. 11, a device for detecting an ultrasonic cutter detection device and method, it differs from the device and method disclosed in embodiment 1 in that:

A cross section of the ultrasonic cutter detection head 2" is U-shaped, the opening of the ultrasonic cutter detection head 2" is provided with two force adjustment knobs 9, the two force adjustment knobs 9 are oppositely arranged to each other, the force adjustment knob 9 comprises a bolt 91, a spring 92 and a contact rod 93 contacted with the ultrasonic cutter 8, which are sequentially connected, the ultrasonic cutter detection head 2" is provided with a hole 94 through which the contact rod 93 passes, the bolt 91 is connected with the ultrasonic cutter detection head 2" through a bolt seat 95, and the other end of the contact rod 93 is always retained in the hole 94.

A contacted part of the contact rod 93 contacted with the ultrasonic cutter 8 is made of nylon and is electrically connected with a current and voltage detection device, the spring 92 is a precision spring with an adjustment range of 0 to 50 N and a stiffness coefficient of 2 N/mm, and a screw pitch of the bolt 91 is 1 mm.

Figure 9:
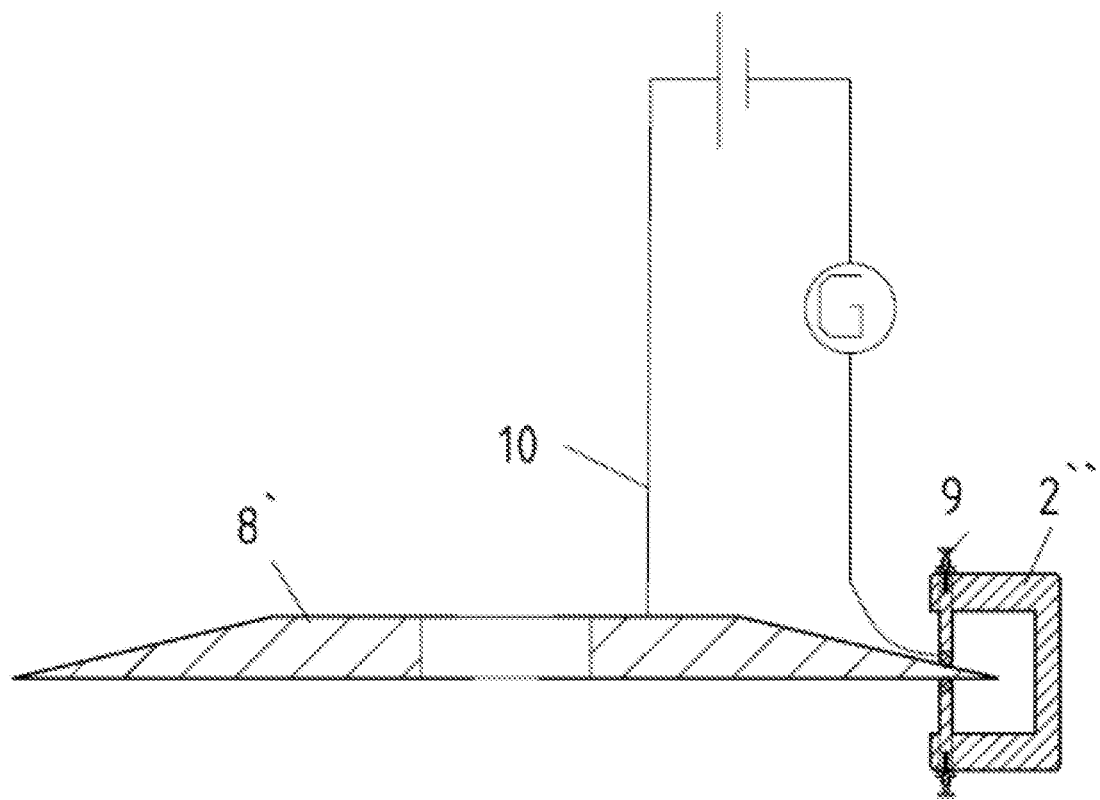
FIG. 9 is a diagram illustrating the connection between the ultrasonic cutter detection head and the ultrasonic cutter with a disk-shaped ultrasonic knife in the embodiment 3 of the present disclosure.
Figure 10:
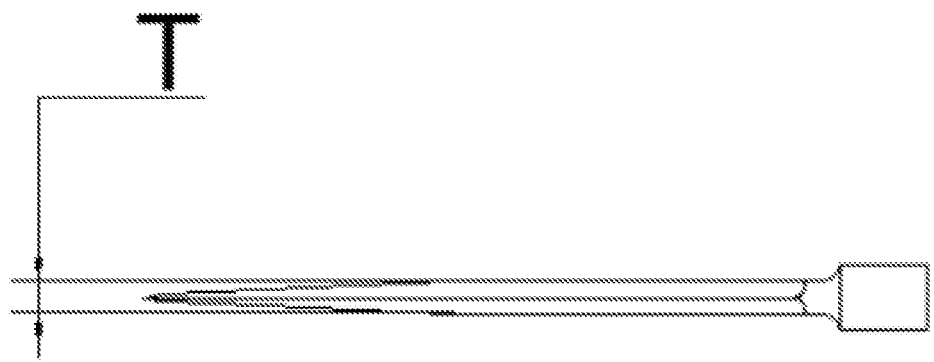
FIG. 10 is a front view of the ultrasonic cutter with the straight-blade knife in the embodiments of the present disclosure.
Figure 11:
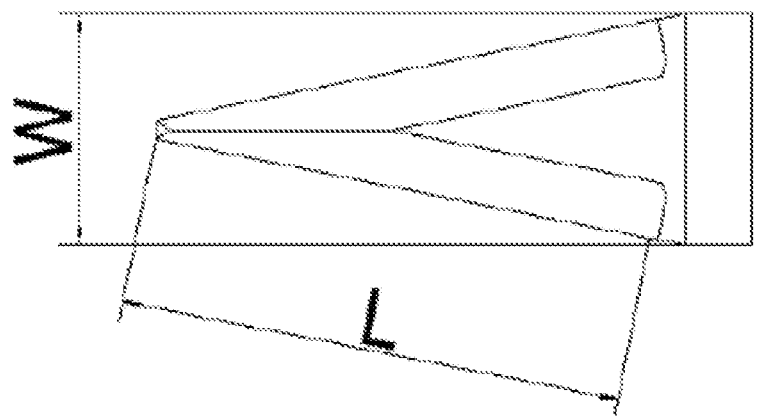
FIG. 11 is a top view of FIG. 10.
Figure 12:
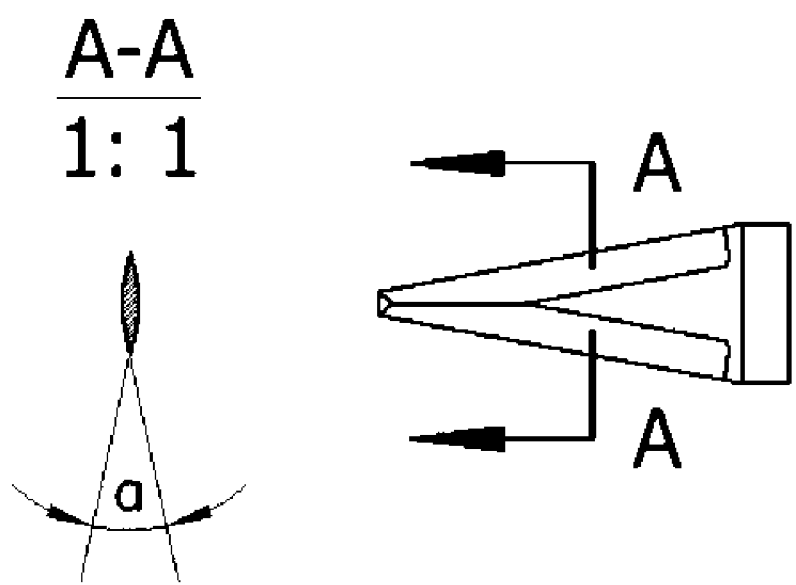
FIG. 12 is a diagram illustrating a wedge angle of a blade of a straight-blade knife.
Figure 13:
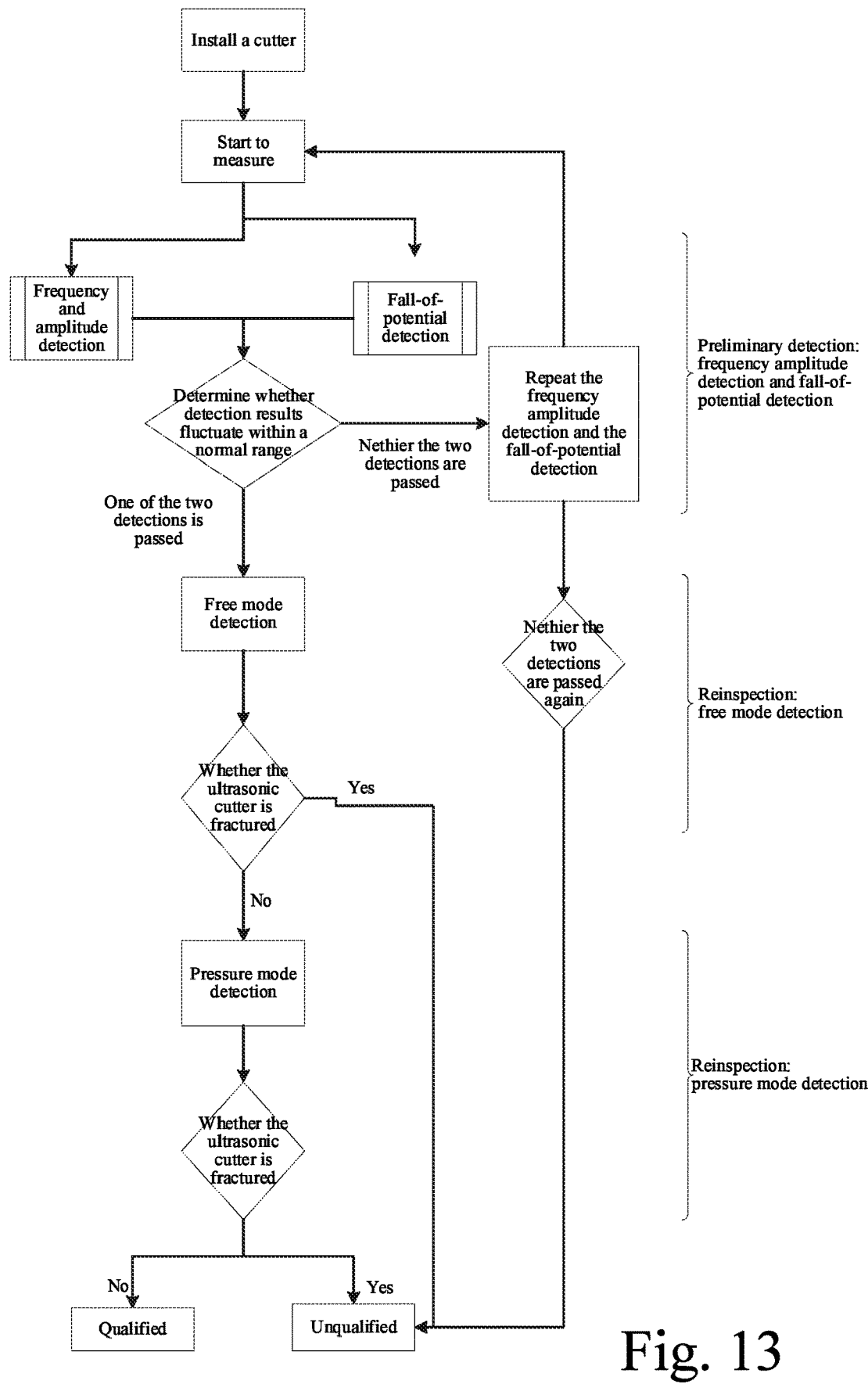
FIG. 13 is a flow chart of the ultrasonic cutter detection method.

As shown in FIG. 9, the ultrasonic cutter can also be a disk-shaped ultrasonic cutter 8'.

The forgoing is only preferred detailed embodiments of the present disclosure, but does not limit the protection scope of the present invention. The equal replacement or amendment made by any skilled in the art in the technical scope disclosed by the present invention according to the technical solutions and the inventive concept of the present invention shall be included with the protection scope of the present invention.

The invention claimed is:

1. An ultrasonic cutter detection method, comprising the following steps:
    performing a preliminary detection by frequency amplitude detection and/or by fall-of-potential detection:
    wherein the frequency amplitude detection comprises: causing an ultrasonic cutter to be in a resonant state, and collecting resonant frequency and vibration amplitude of the ultrasonic cutter at a plurality of positions on the ultrasonic cutter; and if the resonant frequencies and the amplitudes collected all fluctuate within a normal range, determining that the ultrasonic cutter passes the preliminary detection,
    wherein the fall-of-potential detection comprises: contacting a detection head with the ultrasonic cutter, then causing the ultrasonic cutter to be in a resonant state, and detecting a voltage and current between a first contact point between the ultrasonic cutter and the detection head and a point on the ultrasonic cutter that is other than the first contact point detecting voltage and current between a second contact point between the ultrasonic cutter and the detection head and a point on the ultrasonic cutter that is other than the second contact point; and if the voltages and the currents detected all fluctuate within a normal range, determining that the ultrasonic cutter passes preliminary detection; and
    performing reinspection by free mode detection and by pressure mode detection,
    wherein the free mode detection comprises: causing the ultrasonic cutter to vibrate in a frequency range of 15 kHz to 40 kHz, identifying all resonant modes of the ultrasonic cutter in the frequency range of 15 kHz to 40 kHz and causing the ultrasonic cutter to resonate at said resonant modes, if the ultrasonic cutter does not fracture after vibrating with an amplitude exceeding a normal working amplitude by at least 20%, determining that the ultrasonic cutter passes the free mode detection, and
    wherein the pressure mode detection comprises: contacting the detection head with the ultrasonic cutter at a third contact point and applying a first pressure with the detection head at the third contact point on the ultrasonic cutter, wherein the first pressure exceeds a normal working pressure by at least 20%, and identifying all resonant modes of the ultrasonic cutter in the frequency range of 15 kHz to 40 kHz and causing the ultrasonic cutter to resonate at said resonant modes; if the ultrasonic cutter does not fracture, applying a second pressure that exceeds the normal working pressure by at least 20% to a fourth contact point between the detection head and the ultrasonic cutter, identifying all resonate modes in the frequency range of 15 kHz to 40 kHz, and causing the ultrasonic cutter to resonate at said resonant modes; and if the ultrasonic cutter does not fracture, determining that the ultrasonic cutter passes the reinspection.

2. The ultrasonic cutter detection method according to claim 1, wherein the vibrating of the ultrasonic cutter is realized through an ultrasonic amplitude transformer connected therewith, and the ultrasonic amplitude transformer is driven by an ultrasonic power supply to change the frequency and the amplitude of the ultrasonic cutter.

3. The ultrasonic cutter detection method according to claim 2, wherein the ultrasonic power supply automatically searches resonant frequencies and repeatedly adjusts output power and output frequency of the ultrasonic power supply to make the ultrasonic cutter reach resonance.

4. The ultrasonic cutter detection method according to claim 1, wherein magnitude and direction of the applied pressure in the pressure mode detection are time functions or constants.

5. The ultrasonic cutter detection method according to claim 1, wherein the resonant frequency and the amplitude in the frequency amplitude detection are collected by a laser displacement sensor.

\* \* \* \* \*